United States Patent
Chuang et al.

(10) Patent No.: US 11,510,513 B2
(45) Date of Patent: Nov. 29, 2022

(54) EDIBLE CAP

(71) Applicant: ZHEN YI XUAN FOOD ENTERPRISES CO., Taichung (TW)

(72) Inventors: Yi-Min Chuang, Taichung (TW); Chih-Ching Chang, Taichung (TW)

(73) Assignee: ZHEN YI XUAN FOOD ENTERPRISES CO., Taichung (TW)

( * ) Notice: Subject to any disclaimer, the term of this patent is extended or adjusted under 35 U.S.C. 154(b) by 116 days.

(21) Appl. No.: 17/171,547

(22) Filed: Feb. 9, 2021

(65) Prior Publication Data
US 2021/0289966 A1    Sep. 23, 2021

(30) Foreign Application Priority Data

Mar. 17, 2020 (TW) .................................. 109108686

(51) Int. Cl.
*A47G 19/22* (2006.01)
*B65D 43/08* (2006.01)
(Continued)

(52) U.S. Cl.
CPC ......... *A47G 19/2272* (2013.01); *B65D 41/48* (2013.01); *B65D 41/56* (2013.01); *B65D 43/08* (2013.01); *B65D 51/005* (2013.01); *C08K 7/00* (2013.01); *C08K 9/10* (2013.01); *C08L 3/02* (2013.01); *A47G 2400/105* (2013.01); *B65D 2543/00046* (2013.01); *B65D 2543/00305* (2013.01)

(58) Field of Classification Search
CPC ............ A47G 19/2272; A47G 19/2266; B65D 41/48; B65D 41/56; B65D 43/08;
(Continued)

(56) References Cited

U.S. PATENT DOCUMENTS 1,794,238 A * 2/1931 McKibben ............. A23G 9/506
D7/672
2,492,832 A * 12/1949 Barasch ................. A23G 9/506
426/139
(Continued)

FOREIGN PATENT DOCUMENTS

| JP | S62123920 U | * | 8/1987 | ............. B32B 15/08 |
| JP | H0223366 U | * | 2/1990 | ............. B65D 53/04 |
| JP | 05254571 A | * | 10/1993 | ............. B65D 81/34 |

OTHER PUBLICATIONS

Translation of JP05254571, Okawa, Oct. 5, 1993, Figure (Year: 1993).*

(Continued)

*Primary Examiner* — Robert J Hicks
(74) *Attorney, Agent, or Firm* — Muncy, Geissler, Olds & Lowe, P.C.

(57) ABSTRACT

An edible cap for selectively covering an open end of a cup includes an edible flat body, an edible wax layer and an edible film. The edible flat body is in the form of a cap. The edible flat body is a solid body including a top portion and a wall extending around the top portion in a circle of a certain diameter to provide a profile in compliance with the open end of the cup. The wall includes an opening for receiving the open end of the cup. The edible wax layer is attached to a face of the edible flat body. The edible film is attached to a face of the edible wax layer opposite to the flat body in a detachable manner.

14 Claims, 6 Drawing Sheets

(51) Int. Cl.
    *B65D 51/00*           (2006.01)
    *B65D 41/48*           (2006.01)
    *B65D 41/56*           (2006.01)
    *C08K 9/10*            (2006.01)
    *C08L 3/02*            (2006.01)
    *C08K 7/00*            (2006.01)

(58) Field of Classification Search
    CPC .......... B65D 51/005; C08K 7/00; C08K 9/10; C08L 3/02
    USPC ......... 220/713, 712, 711; 426/138, 140, 277
    See application file for complete search history.

(56) References Cited

U.S. PATENT DOCUMENTS 5,316,777 A * 5/1994 Toyoda .................... B32B 7/12
                                                          428/317.1
5,316,841 A * 5/1994 Kohama ................ B32B 27/32
                                                           428/910

OTHER PUBLICATIONS

Translation of JPS62123920, Shoya et al., Aug. 6, 1987, Figure 1 (Year: 1987).*
Translation of JPH0223366, Iwai, Feb. 15, 1990, Fig. 2 (Year: 1990).*

* cited by examiner

EDIBLE CAP

BACKGROUND OF INVENTION

1. Field of Invention

The present invention relates to a cap for a cup and, more particularly, to an edible cap.

2. Related Prior Art

Conventional disposable cups are made of plastics such as synthetic resin such as polypropylene ("PP"). However, such plastic disposable cups can hardly be decomposed and hence causes a serious problem to the environment. Hence, plastic disposable cups are banned in many countries.

To reduce the use of plastics, currently disposable cups are made of paper with plastic coating. A paper cup is often used with a cap to keep liquid in the paper cup. However, such caps are typically made of plastics such as synthetic resin such as PP and hence cause a serious problem to the environment.

The present invention is therefore intended to obviate or at least alleviate the problems encountered in the prior art.

SUMMARY OF INVENTION

It is the primary objective of the present invention to provide a cup with an edible cap.

To achieve the foregoing objective, the edible cap includes an edible flat body, an edible wax layer and an edible film. The edible flat body is in the form of a cap. The edible flat body is a solid body including a top portion and a wall extending around the top portion in a circle of a certain diameter to provide a profile in compliance with the open end of the. The wall includes an opening for receiving the open end of the cup. The edible wax layer is attached to a face of the edible flat body. The edible film is attached to a face of the edible wax layer opposite to the flat body in a detachable manner Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
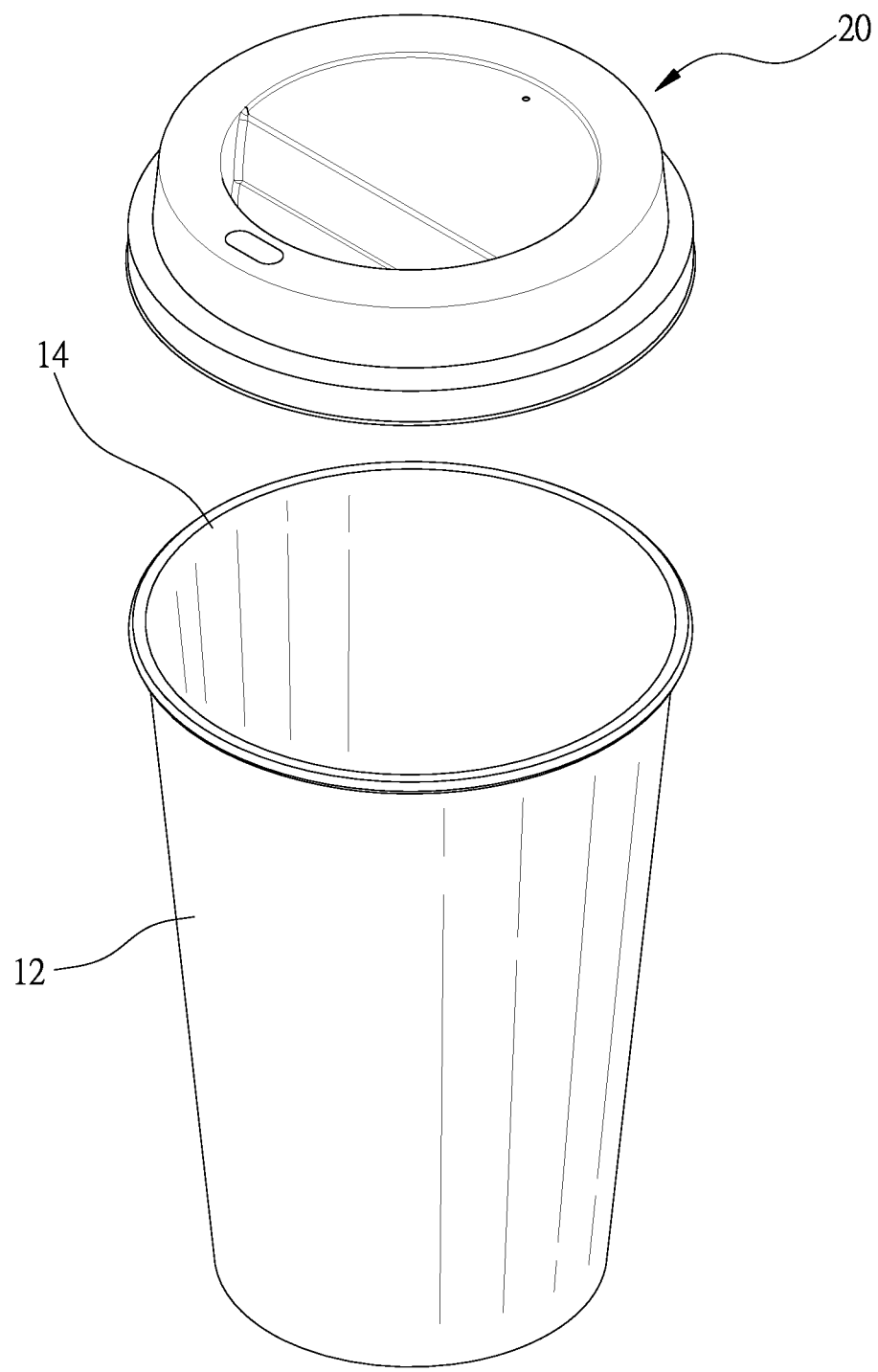
FIG. 1 is a perspective view of a cup used with a cap according to the first embodiment of the present invention.

Referring to FIG. 1, a cup 12 is used with a cap 20 according to a first embodiment of the present invention. The cup 12 includes an open end and a closed end. The cup 12 includes an upper edge 14 that extends around the open end. Liquid such as water, coffee, tea and any other drinks is filled into or poured from the cup 12 via the open end. The open end of the cup 12 can be closed by the cap 20.

Figure 2:
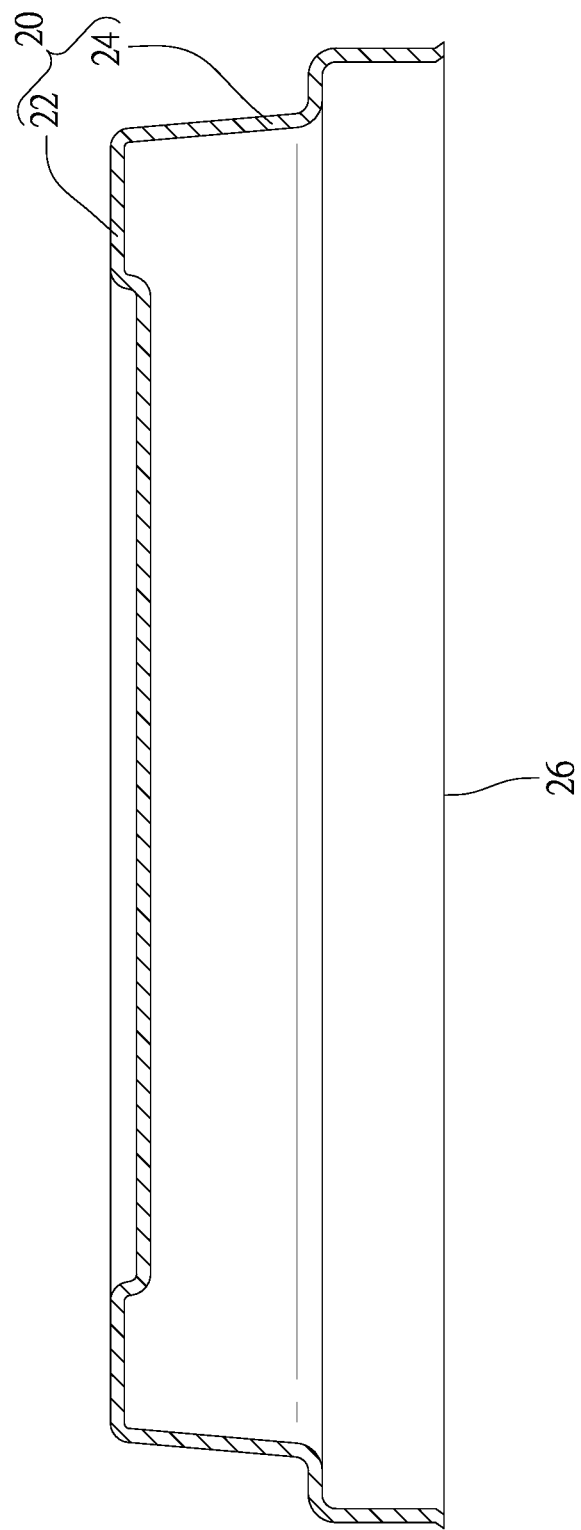
FIG. 2 is a cross-sectional view of the cap shown in FIG. 1.

Referring to FIG. 2, the cap 20 includes a top portion 22 formed on a wall 24 that extends in a circle in compliance with the upper edge 14 of the cup 12. The wall 24 includes a lower edge (not numbered) that extends around an opening 26 of the cap 20. The upper edge 14 of the cup 12 is inserted in the wall 24 of the cap 20 via the opening 26. The upper edge 14 of the cup 12 is fitted in the wall 24 of the cap 20 to keep the cap 20 on the cup 12.

Figure 3:
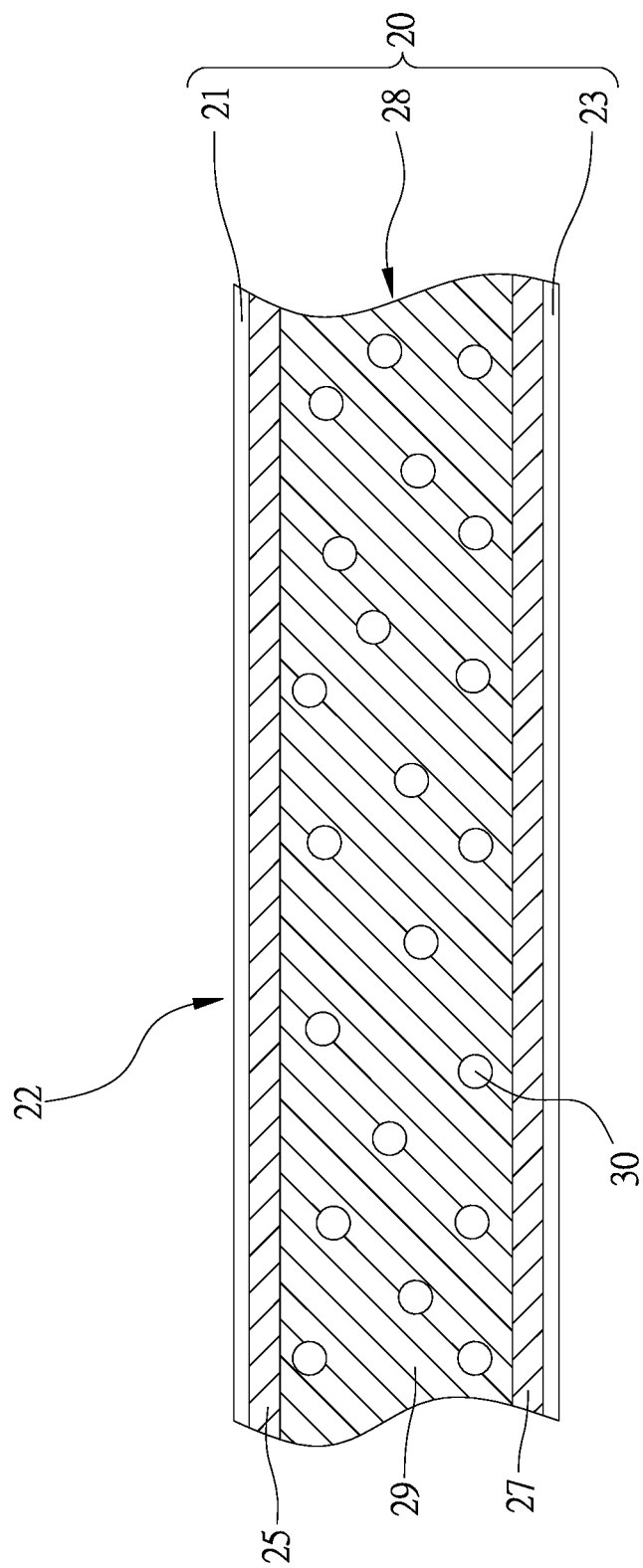
FIG. 3 is an enlarged partial view of the cap shown in FIG. 2.

Referring to FIG. 3, the cap 20 includes two films 21 and 23 respectively attached to two opposite faces of a flat body 28. Each of the films 21 and 23 extends over the top portion 22 and/or the wall 24. The films 21 and 23 are preferably two separate elements. However, the films 21 and 23 can be made in one piece in another embodiment.

Preferably, the films 21 and 23 are made of an edible material, and the flat body 28 is made of another edible material. The films 21 and 23 are used to protectively cover the flat body 28.

The films 21 and 23 are preferably made of an edible material that is made from plants or animals. The films 21 and 23 can be made of starch, gelatin or lecithin. For example, the films 21 and 23 are preferably made of glutinous rice.

Alternatively, the films 21 and 23 can be made of a combination of casein with pectin. The casein is derived from milk. To make the films 21 and 23, casein in the form of liquid is sprayed onto the flat body 28. The casein cures and becomes the films 21 and 23 to protect the flat body 28 from oxygen in the air. Thus, the films 21 and 23 prevent the flat body 28 from decaying. The effect of the casein is 500 times as well as current plastics. Moreover, the casein can be decomposed as well as eaten.

The pectin is a natural polymer compound such as citrus pectin. The pectin is mixed with the casein to improve the strength, wet fastness and heat resistance of the films 21 and 23. Thus, the films 21 and 23 cannot easily be dissolved by liquid.

The flat body 28 includes a starch layer 29 and two wax layers 25 and 27 respectively attached to two opposite faces of the starch 29. The starch layer 29 is a core of the cap 20. The starch layer 29 extends in the top portion 22 and/or the wall 24 of the cap 20.

The starch layer 29 is made of starch or amylum. The starch is in the form of powder or grains of wheat, potato, corn, yam, cassava, lotus root, rice, konjac or modified starch for example. Therefore, the starch layer 29 is edible and absorbable by human bodies. The starch layer 29 is intended to render the cap 20 crunchy like cookies.

The wax layers 25 and 27 are made of edible wax derived from animals (such as bee wax) or vegetable (such as fruit wax) or made of a mixture of edible wax with fatty wax. Hence, the wax layers 25 and 27 are edible and sticky.

When the wax layers 25 and 27 are attached to the opposite faces of the starch layer 29. The wax layer 25 is used as an adhesive layer to adhere the film 21 to the starch layer 29. The wax layer 27 is used as another adhesive layer to adhere the film 23 to the starch layer 29. Thus, the films 21 and 23 can be attached to or detached from the flat body 28. Moreover, the starch layer 29 includes micro capsules 30 with a diameter of 30 to 1000 μm (micrometer).

Figure 4:
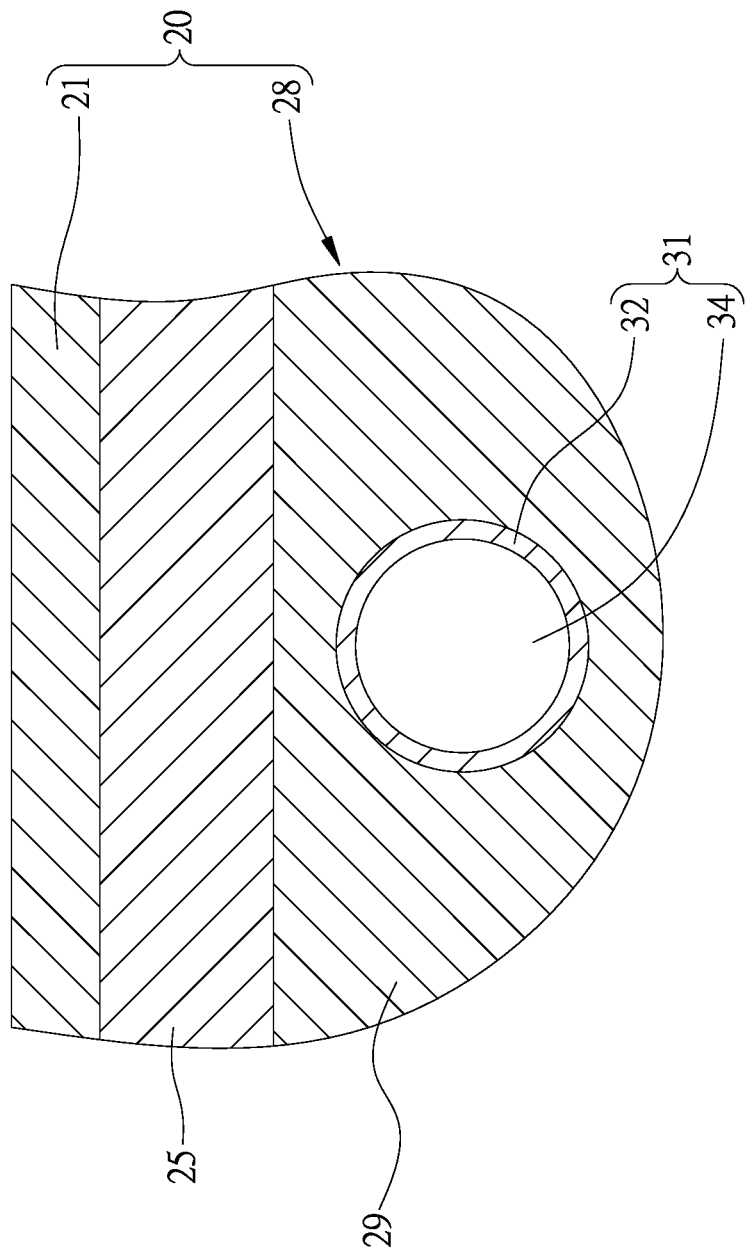
FIG. 4 is an enlarged partial view of the cap shown in FIG. 3.

Referring to FIG. 4, some of the micro capsules 30 are hollow capsules 31. Each of the hollow capsules 31 includes an edible shell 32 filled with a gaseous material 34 such as air.

Figure 5:
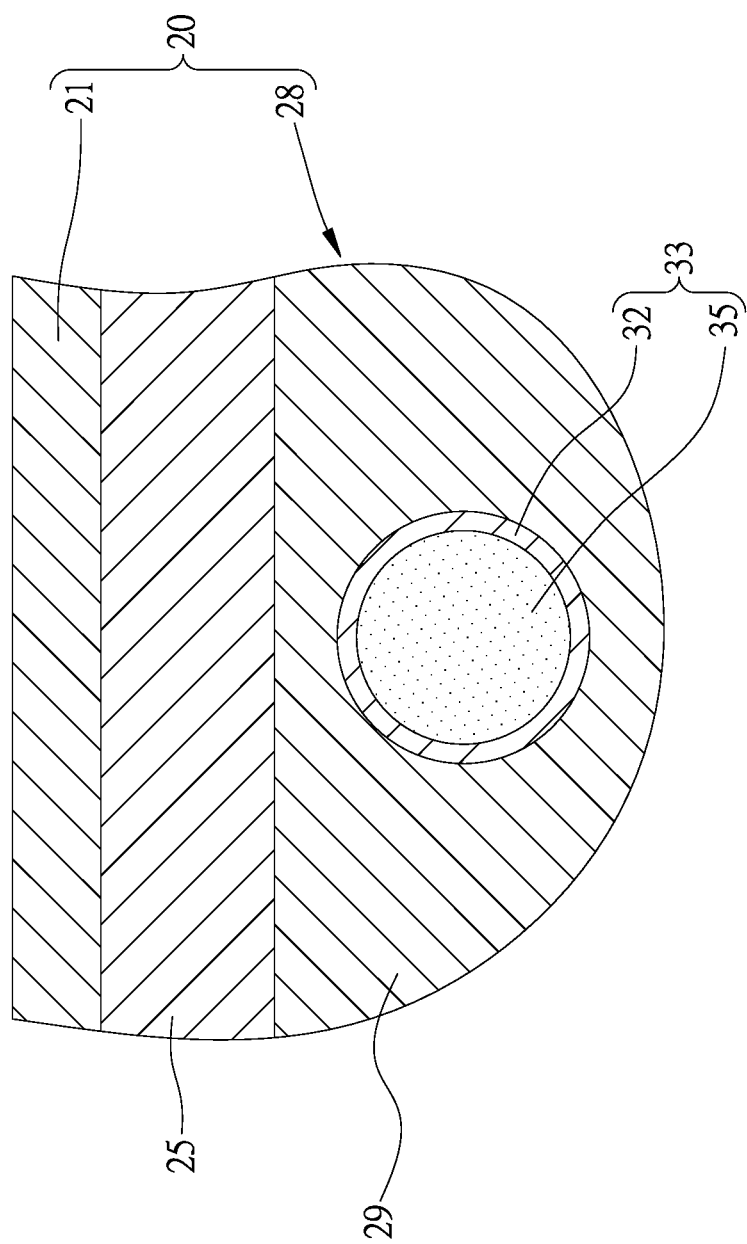
FIG. 5 is another enlarged partial view of the cap shown in FIG. 3.

Referring to FIG. 5, the other of the micro capsules 30 are solid capsules 33. Each of the solid capsules 33 includes an edible shell 32 that contains filling 35 in the form of liquid or solid. The filling 35 is made of cream, chocolate, strawberry jam, milk and any other flavored dairy products, sweetener or seasoning for example.

Therefore, the micro capsules are edible and absorbable by human bodies.

Referring to FIG. 1, during transportation, the films 21 and 23 protect the flat body 28 from contaminants.

The films 21 and 23 keep the flat body 28 from liquid contained in the cup 12 as the cap 20 closes the open end of the cup 12. Thus, the flat body 28 does not get wet, softened or dissolved. Advantageously, the flat body 28 effectively keeps the liquid in the cup 12, without any leakage. Alternatively, the cap 20 can be consumed by a user or decomposed in the environment.

As mentioned above, the films 21 and 23 can be detached from the flat body 28. The flat body 28 can be eaten by the user and the films 21 and 23 can be decomposed in the environment. Alternatively, the films 21 and 23 and the flat body 28 can all be eaten by the user.

Moreover, the films 21 and 23 and/or the flat body 28 can be eaten with the liquid contained in the cup 12.

Figure 6:
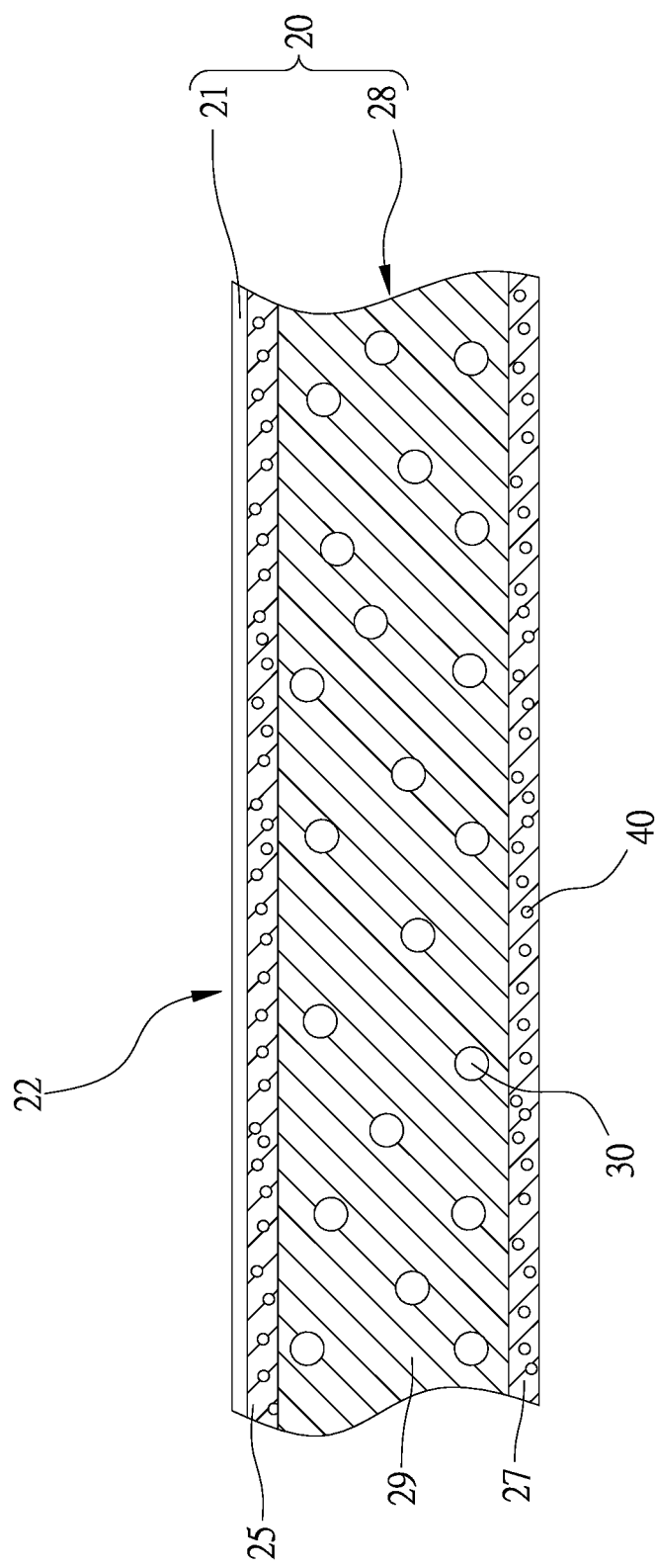
FIG. 6 is a partial and cross-sectional view of a cap according to the second embodiment of the present invention.

Referring to FIG. 6, there is shown a cap according to a second embodiment of the present invention. The second embodiment is identical to the first embodiment except for several features.

Firstly, the film 23 is saved. That is, only the film 21 is attached to an external face of the flat body 28 of the cap 20.

Secondly, each of the wax layers 25 and 27 contains grains 40. The grains 40 can be grinded nut such as hazel nut, walnut, almond, cashew nut, pine nut, chest nut, ginkgo, pistachio, macadamia, peanut, sunflower seed, pumpkin seed and water melon seed.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:

1. An edible cap for selectively covering an open end of a cup, the edible cap comprising:
   an edible flat body in the form of a cap, wherein the edible flat body is a solid body comprising a top portion and a wall extending around the top portion in a circle of a certain diameter to provide a profile in compliance with the open end of the cup, wherein the wall comprises an opening for receiving the open end of the cup;
   at least one edible wax layer attached to at least one face of the edible flat body; and
   at least one edible film attached to a face of the edible wax layer opposite to the flat body in a detachable manner.

2. The edible cap according to claim 1, wherein the film is made of starch.

3. The edible cap according to claim 1, wherein the film is made from an animal.

4. The edible cap according to claim 1, wherein the film is made from a plant.

5. The edible cap according to claim 1, wherein the film is made of a mixture of casein with pectin.

6. The edible cap according to claim 1, wherein the flat body comprises an edible starch layer.

7. The edible cap according to claim 6, wherein the wax layer is made of an animal.

8. The edible cap according to claim 6, wherein the wax layer is made of a plant.

9. The edible cap according to claim 6, wherein the wax layer is made of a mixture of edible wax with fatty acid.

10. The edible cap according to claim 6, wherein the flat body further comprises grains inserted in the wax layer.

11. The edible cap according to claim 6, wherein the flat body further comprises micro capsules inserted in the starch layer.

12. The edible cap according to claim 11, wherein the micro capsules are made with a diameter of 30 to 1000 μm.

13. The edible cap according to claim 11, wherein at least one of the micro capsules comprises a shell and a gaseous material filled in the shell.

14. The edible cap according to claim 11, wherein at least one of the micro capsules comprises a shell and filling contained in the shell.

* * * * *